April 23, 1940. G. G. INGALLS Re. 21,431
BRAKE OPERATING MECHANISM
Original Filed May 13, 1936
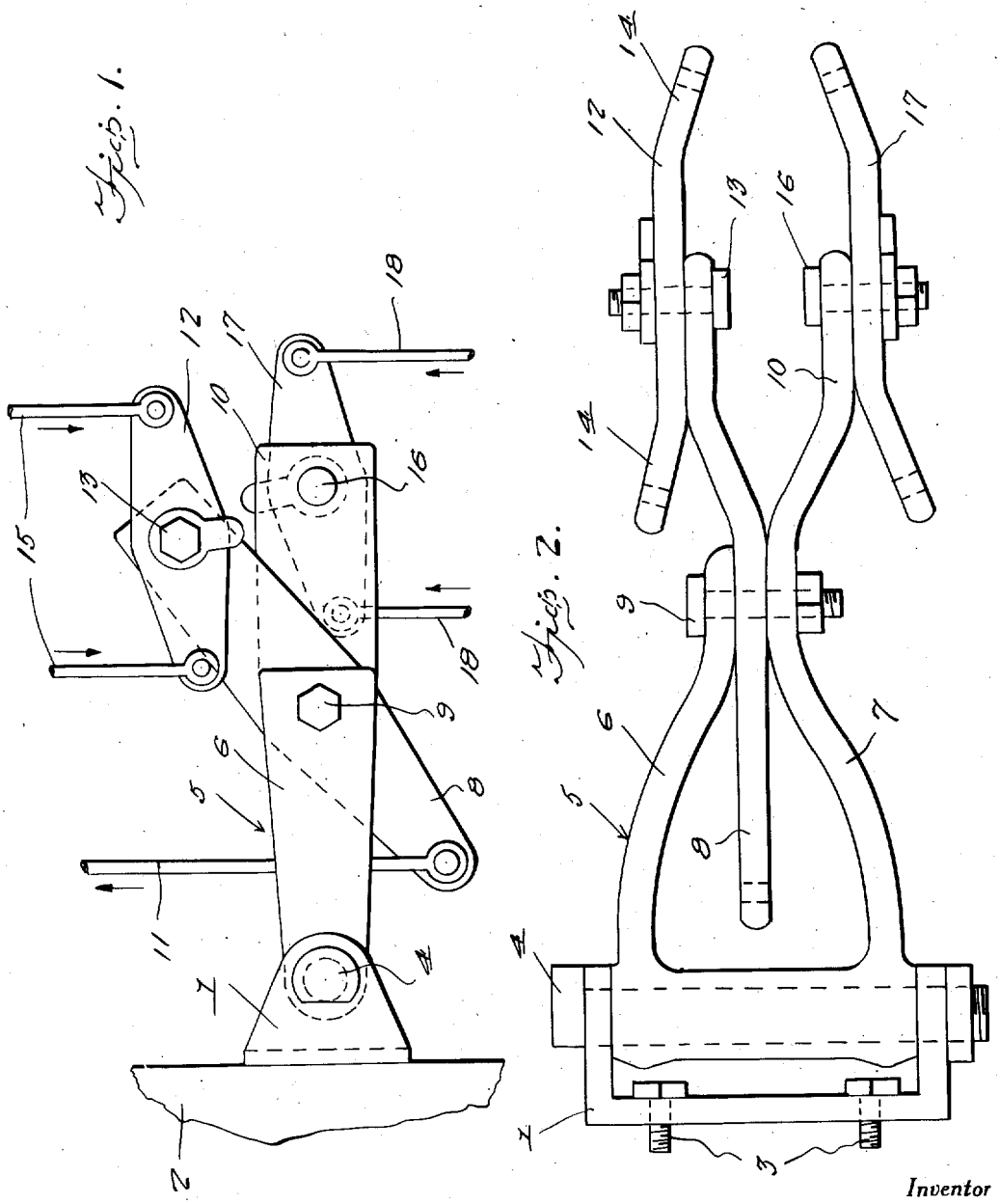
Inventor
G. G. Ingalls
By Clarence O'Brien
Hyman Berman
Attorneys Reissued Apr. 23, 1940

Re. 21,431

UNITED STATES PATENT OFFICE 21,431

BRAKE OPERATING MECHANISM

Gerry G. Ingalls, Newport, Minn.

Original No. 2,098,546, dated November 9, 1937, Serial No. 79,581, May 13, 1936. Application for reissue October 19, 1939, Serial No. 300,241

4 Claims. (Cl. 188—204)

The present invention relates to new and useful improvements in brake operators for vehicles having four wheel brakes and has for one of its important objects to provide, in a manner as hereinafter set forth, a mechanism of this character which, as the brakes are set, will automatically equalize the pull from the foot pedal on all four brakes of the vehicle.

Another very important object of the invention is to provide a brake operating mechanism of the aforementioned character embodying a novel construction, combination and arrangement of parts for materially boosting the power applied to the brakes.

Other objects of the invention are to provide a four wheel brake equalizing and power boosting mechanism for vehicles which will be comparatively simple in construction, strong, durable, highly efficient and reliable in use, compact, light in weight and which may be manufactured at low cost.

All of the foregoing and still further objects and advantages of the invention will become apparent from a study of the following specification, taken in connection with the accompanying drawing wherein like characters of reference designate corresponding parts throughout the several views and wherein:

Figure 1 is a top plan view of a brake operating mechanism constructed in accordance with the present invention.

Figure 2 is a view in rear elevation thereof.

Referring now to the drawing in detail, it will be seen that the embodiment of the invention which has been illustrated comprises a substantially U-shaped bracket 1 which is rigidly secured on the frame 2 of an automobile by suitable means, such as bolts 3. Journalled for swinging movement in a horizontal plane on a bolt 4 in the bracket 1 is a yoke which is designated generally by the reference numeral 5.

The yoke 5 includes inwardly curved legs 6 and 7 between which a lever 8 is journalled, at an intermediate point, on a pin or bolt 9. The leg 7 of the yoke 5 includes an offset extension 10. Connected to one end of the lever 8 is a rod 11 from the usual foot pedal (not shown) of the automobile.

The reference numeral 12 designates an equalizing lever which is pivotally mounted at an intermediate point, as at 13, on the other end portion of the lever 8. The equalizing lever 12 comprises oppositely turned, apertured end portions 14 to which rods 15 to the front wheel brakes of the automobile are connected, Pivotally mounted at an intermediate point, as at 16, on the free end portion of the extension 10 of the leg 7 is an equalizing lever 17 which is similar in construction to the lever 12 and to which the rods 18 to the rear brakes of the automobile are connected.

It is thought that the operation of the invention will be readily apparent from a consideration of the foregoing. When the foot pedal of the automobile is depressed in the usual manner the lever 8 is actuated by the rod 11 in a direction to swing the equalizing lever 12 rearwardly, thereby pulling the rods 15 rearwardly for applying the front brakes. Simultaneously with the application of the front brakes the yoke 5 is swung forwardly in a manner to pull the rods 18 in a forward direction for applying the rear brakes of the vehicle. The direction of movement of the rods 11, 15 and 18 is indicated by the arrows in Figure 1 of the drawing. The construction and arrangement of the yoke 5, the levers 8, 12 and 17, etc., is such that, in addition to automatically equalizing the brakes, even though certain of the brake rods may be out of adjustment, the power applied to each brake will be materially boosted or increased.

It is believed that the many advantages of a brake operating mechanism constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:

1. A brake operating mechanism for four wheel brakes on automobiles including, a yoke pivotally mounted at one end for horizontal swinging movement and comprising a pair of upper and lower arms the lower one longer than the upper one, an operating lever pivotally mounted intermediate its ends between said arms and adjacent to the outer end of the shorter arm to swing about a vertical axis and having an inner end disposed intermediate the pivot thereof and the pivot of said yoke and an outer end adapted to overlie the outer end of the longer yoke arm, the inner end being connected to the brake pedal of the automobile, a brake rod lever pivoted intermediate its ends on the outer end of the longer yoke arm and having a pair of brake rods connected to its opposite ends, respectively, a similar brake rod lever pivoted intermediate its ends on the outer end of the operating lever at the same distance from the pivot of the operating lever as the pivot of the brake rod lever first mentioned, and a pair of brake rods connected to opposite ends of the last mentioned brake rod lever, respectively.

2. A brake operating mechanism for four wheel brakes on vehicles including, a yoke pivotally mounted at one end for horizontal swinging movement and comprising a pair of upper and lower arms one of which arms is longer than the other, an operating lever pivotally mounted intermediate its ends upon said yoke intermediate the ends of the longer arm to swing about a vertical axis and having an inner end disposed intermediate the pivot thereof and the pivot of said yoke and an outer end adapted to substantially aline vertically with the outer end of the longer yoke arm, the inner end of said operating lever being adapted to be connected to the brake pedal of the vehicle, a brake rod lever pivoted intermediate its ends on the outer end of the longer yoke arm, a pair of brake rods connected to the opposite ends respectively of said brake rod lever, a brake rod lever pivoted intermediate its ends on the outer end of the operating lever at the same distance from the pivot of the operating lever as the pivot of the brake rod lever first mentioned, and a pair of brake rods connected to the opposite ends respectively of the last mentioned brake rod lever.

3. In a vehicle having four wheel brakes, a brake operating mechanism comprising, a member pivotally mounted at one end on the vehicle for swinging movement, an operating lever pivoted between its ends to a swinging portion of the said member, said operating lever having means at its end nearest the pivot point of said member for attachment to a power applying device, an equalizing bar pivoted to the outer end of said operating lever, an equalizing bar pivoted to the outer end of said member, the pivots of said equalizing bars being both located at the side of the pivot of said operating lever remote from said end nearest the pivot point of said member, a pair of brake applying devices applied respectively to the respective ends of said first mentioned bar and a pair of brake applying devices applied respectively to the respective ends of said last mentioned bar.

4. In a vehicle having four wheel brakes, a brake operating mechanism comprising, a member pivotally mounted at one end on the vehicle for swinging movement, an operating lever having first and second ends and pivoted between said first and second ends to a swinging portion of said member, said operating lever having means at its first end for attachment of a power applying device, an equalizing bar pivoted to the second end of said operating lever, an equalizing bar pivoted to said member at the same side of the pivot about which said operating member swings on said member as the side on which said second end of said operating lever is located, a pair of brake applying devices applied respectively to the respective ends of said first mentioned bar and a pair of brake applying devices applied respectively to the respective ends of said last mentioned bar.

GERRY G. INGALLS.